United States Patent Office 3,346,588
Patented Oct. 10, 1967

3,346,588
SILICON-SUBSTITUTED PYRROLES
Bruce A. Ashby, Schenectady, N.Y., assignor to General Electric Company, a corporation of New York
No Drawing. Filed Oct. 1, 1965, Ser. No. 492,285
9 Claims. (Cl. 260—326.61)

This invention relates to certain organosilicon compounds in which silylmethyl groups are attached to a pyrrole nucleus. More particularly, the present invention relates to silylmethyl-substituted pyrroles having a formula selected from the class consisting of:

(1) 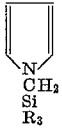

and (2) 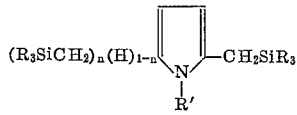

where R is a member selected from the class consisting of monovalent hydrocarbon radicals free of aliphatic unsaturation and lower alkoxy radicals, R' is a lower alkyl radical, e.g., an alkyl radical containing from about 1 to 7 carbon atoms, and $n$ is a whole number equal to from 0 to 1, inclusive.

In the preferred embodiment of my invention, R is an alkyl radical, such as methyl, or is ethoxy, the R' group is methyl, and $n$ is equal to 1. However, the group represented by R can include many other hydrocarbon radicals or lower alkoxy groups including, for example, alkyl radicals of from 1 to 8 carbon atoms, e.g., ethyl, propyl, butyl, octyl, etc. radicals; aryl radicals, e.g., phenyl, naphthyl, xylyl, tolyl, etc. radicals; aralkyl radicals, e.g., benzyl, phenylethyl, etc. radicals, and alkoxy radicals from methoxy to heptoxy. The alkyl radicals represented by R', as previously indicated, are the lower alkyl radicals, e.g., those radicals from methyl through heptyl.

The silylmethyl-substituted pyrroles of the present invention have various utilities, depending upon their particular compositions. However, all of the compounds of the present invention are useful as stabilizers and antioxidants for tetrachloroethylene and trichloroethylene and, in addition, all of these materials are useful as stabilizers for both natural and synthetic rubbers, including silicone rubber, where the presence of the silylmethyl group increases the compatibility of the pyrrole compound for the silicone rubber. The silylmethyl-substituted pyrroles in which one or more of the silicon-bonded R groups are alkoxy groups are particularly useful in the formation of copolymers with other organosiloxanes.

The silylmethyl-substituted pyrroles of the present invention can be prepared by one of two relatively straightforward procedures, each of which involves an organo-metal derivative of pyrrole and a chloromethyl silicon compound having the formula:

(3)            ClCH₂SiR₃ where R is as previously defined. In the case of the substituted pyrroles of Formula 1, 1-potassium pyrrole having the formula:

(4) 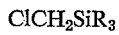

is prepared by refluxing a mixture of potassium in a molar excess of pyrrole dissolved in a solvent, such as toluene or benzene. The chloromethyl silicon compound is then reacted with the potassium derivative. In the case of the substituted pyrroles of Formula 2, the 1-substituted pyrrole starting material having the formula:

(5) 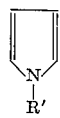

is refluxed with n-butyl lithium in a solvent, such as hexane, to form the 2-lithium derivative having the formula:

(6) 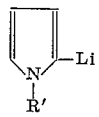

or, in the case where substituents in both the 2- and 5-positions are desired, the materials are reacted in the ratio of 2 moles of n-butyl lithium per mole of the 1-alkyl-substituted pyrrole to produced the 2,5-dilithium derivative of the pyrrole compound having the formula:

(7) 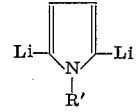

The lithium or dilithium derivative is then reacted with the chloromethyl silicon compound of Formula 3.

The chloromethyl silicon compound of Formula 3 is generally prepared from chloromethyltrichlorosilane by the Grignard addition of the desired hydrocarbon groups within the scope of R and then any remaining silicon-bonded chlorine atoms are converted to alkoxy groups within the scope of R by conventional means.

The following examples are illustrative of the practice of my invention and are not intended for purposes of limitation.

Example 1

Potassium pyrrole was prepared by refluxing for about 4 hours a mixture of 34.4 g. (0.88 gram-atom) of diced potassium metal and 79 g. (1.18 moles) of pyrrole in 350 ml. of dry toluene under a blanket of dry nitrogen. Then, 108 g. (0.88 mole) of chloromethyltrimethylsilane was added. The mixture was refluxed for 72 hours at which time chromatographic analysis showed that all of the silane had reacted. The reaction mixture was filtered under nitrogen and the filtrate was fractionally distilled to produce 80.0 g. (59% yield) of 1-(trimethylsilylmethyl) pyrrole having the formula:

This material was a liquid having a boiling point of 84° at 30 mm., a refractive index $n_D^{25}$ 1.4744, and a density $d_4^{25}$ 0.872. Chemical analysis of the material showed the presence of 62.90% carbon, 10.01% hydrogen, 9.05% nitrogen, and 18.39% silicon, as compared with the theoretical values of 62.67% carbon, 9.86% hydrogen, 9.14% nitrogen, and 18.32% silicon.

Example 2

Potassium pyrrole was prepared by refluxing for 4 hours a mixture of 19.5 g. (0.5 gram-atom) of diced potassium metal and 45 g. (0.67 mole) of pyrrole in 200 ml. of dry toluene under a blanket of dry nitrogen. Then 76 g. (0.5 mole) of chloromethylethoxydimethylsilane was added and the mixture was refluxed for 72 hours during which time all of the silane reacted. Fractional distillation gave 16.5 g. (18% yield) of product having a boiling point of 120° at 50 mm., a refractive index $n_D^{25}$ 1.4664, and a density $d_4^{25}$ 0.930. Chemical analysis of the material showed 58.96% carbon, 9.35% hydrogen, 7.64% nitrogen, and 15.32% silicon, as compared with the theoretical values of 59.06% carbon, 9.16% hydrogen, 7.91% nitrogen, and 15.07% silicon. This material was 1-(ethoxydimethylsilylmethyl)pyrrole having the formula:

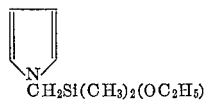
$CH_2Si(CH_3)_2(OC_2H_5)$

Example 3

Following the procedure of Example 2, potassium pyrrole was prepared from 19.5 g. (0.5 gram-atom) of diced potassium metal, 45 g. pyrrole and 200 ml. dry toluene. Then 91 g. (0.50 mole) of chloromethyldiethoxymethylsilane was added and the mixture refluxed for 72 hours and fractionally distilled to yield 57.5 g. (54% yield) of 1-diethoxymethylsilylmethyl)pyrrole having the formula:

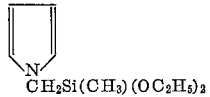
$CH_2Si(CH_3)(OC_2H_5)_2$

This material had a boiling point of 123° at 30 mm., $n_D^{25}$ 1.4574, $d_4^5$ 0.968. Chemical analysis showed 56.41% carbon, 9.02% hydrogen, 6.80% nitrogen, and 13.39% silicon, as compared with the theoretical values of 56.28% carbon, 9.00% hydrogen, 6.56% nitrogen, and 13.17% silicon.

Example 4

Potassium pyrrole was prepared from 19.5 g. (0.5 gram-atom) of diced potassium metal and 45 g. 0.67 mole) of pyrrole in 150 ml. benzene by refluxing for 4 hours under a blanket of dry nitrogen. At this time, 106.5 g. (0.50 mole) of chloromethyltriethoxysilane was added and the mixture was refluxed for 24 hours at which time the silane was no longer detected by gas chromatography. Fractional distillation of a filtrate from the reaction mixture gave 50.2 g. (41% yield) of 1-(trimethoxysilylmethyl)pyrrole having the formula:

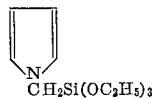
$CH_2Si(OC_2H_5)_3$

This material had a boiling point of 136 to 137° at 29 mm., $n_D^{25}$ 1.4488, $d_4^{25}$ 0.995. Chemical analysis showed the presence of 54.33% carbon, 8.56% hydrogen, 5.66% nitrogen and 11.64% silicon. This compared with the theoretical values of 54.28% carbon, 8.69% hydrogen, 5.76% nitrogen, and 11.58% silicon.

Example 5

To a 470 ml. solution of 0.75 mole of butyl lithium in hexane was added 60 g. (0.74 mole) of 1-methylpyrrole. This mixture was refluxed for 16 hours at the end of which time butane evolution had ceased and the 2-lithium derivative of 1-methylpyrrole had been formed. Then 90.6 g. (0.74 mole) of chloromethyltrimethylsilane was added and the mixture was refluxed for 24 hours. To the cool reaction mixture was then added 100 ml. water, the hexane layer was separated and dried over sodium sulfate, and fractional distillation of the dry benzene layer gave 9.0 g. of 1-methyl-2-(trimethylsilylmethyl)pyrrole having the formula:

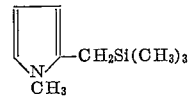
$CH_3$
$-CH_2Si(CH_3)_3$

This product was a liquid having a boiling point of 117 to 118° at 30 mm. The product had a refractive index $n_D^{25}$ 1.4839 and $d_4^{25}$ 0.882. Chemical analysis showed the presence of 64.48% carbon, 10.29% hydrogen, 8.36% nitrogen, and 16.83% silicon, as compared with the theoretical values of 64.63% carbon, 10.24% hydrogen, 8.38% nitrogen, and 16.75% silicon.

Example 6

The dilithium derivative of 1-methylpyrrole was prepared by refluxing a mixture of 625 ml. of a hexane solution containing 64 g. (1.0 mole) of n-butyl lithium and 40.5 g. (0.5 mole) of 1-methylpyrrole under an argon atmosphere for a period of 30 hours during which evolution of butane ceased. This dilithium derivative is converted to 1-methyl-2,5-bis(methoxydimethylsilylmethyl)pyrrole by slowly adding the mixture to 138.5 g. (1.0 mole) of chloromethylmethoxydimethylsilane and refluxing the mixture for 24 hours. The desired product is obtained by fractional distillation. This product has the formula:

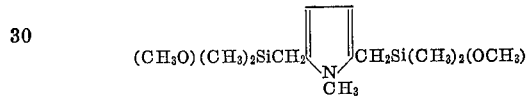
$(CH_3O)(CH_3)_2SiCH_2$ $CH_2Si(CH_3)_2(OCH_3)$
$CH_3$

While the foregoing examples have illustrated a number of the silylmethyl-substituted pyrroles within the scope of the present invention, it is understood that the full scope of the invention is defined by the appended claims, which are directed to the two types of substituted pyrroles shown in Formulas 1 and 2. Substituted pyrroles within the scope of Formulas 1 and 2, which are not specifically illustrated by the examples, are prepared by processes analogous to those illustrated in the specific examples.

What I claim as new and desired to secure by Letters Patent of the United States is:

1. A silylmethyl-substituted pyrrole having a formula selected from the class consisting of:

$CH_2$
$Si$
$R_3$ and

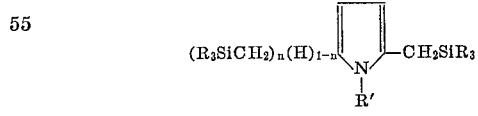
$(R_3SiCH_2)_n(H)_{1-n}$ $-CH_2SiR_3$
$R'$ where R represents a member selected from the class consisting of alkyl of 1 to 8 carbon atoms, phenyl, xylyl, tolyl, naphthyl, benzyl, phenylethyl, and lower alkoxy, R' represents lower alkyl, and n is a whole number equal to from 0 to 1, inclusive.

2. A silylmethyl-substituted pyrrole having the formula:

$CH_2$
$Si$
$R_3$ where R is a member selected from the class consisting of alkyl of 1 to 8 carbon atoms, phenyl, xylyl, tolyl, naphthyl, benzyl, phenylethyl, and lower alkoxy.

3. A silylmethyl-substituted pyrrole having the formula:

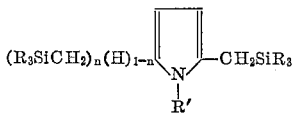

where R is a member selected from the class consisting of alkyl of 1 to 8 carbon atoms, phenyl, xylyl, tolyl, naphthyl, benzyl, phenylethyl, and lower alkoxy and R' is lower alkyl and $n$ is a whole number equal to from 0 to 1, inclusive.

4. 1-(trimethylsilylmethyl)pyrrole.
5. 1-(ethoxydimethylsilylmethyl)pyrrole.
6. 1-(diethoxymethylsilylmethyl)pyrrole.
7. 1-(triethoxysilylmethyl)pyyrole.
8. 1-methyl-2-(trimethylsilylmethyl)pyrrole.
9. 1-methyl-2,5 - bis(methoxydimethylsilylmethyl)pyrrole.

No references cited.

ALEX MAZEL, *Primary Examiner.*

NICHOLAS S. RIZZO, *Examiner.*

M. O'BRIEN, J. A. NARCAVAGE, *Assistant Examiners.*